US009372739B2

(12) United States Patent
Beardsmore et al.

(10) Patent No.: US 9,372,739 B2
(45) Date of Patent: Jun. 21, 2016

(54) MONITORING OF SUBSCRIBER MESSAGE PROCESSING IN A PUBLISH/SUBSCRIBE MESSAGING ENVIRONMENT

(75) Inventors: Anthony P. Beardsmore, Southampton (GB); Jonathan Levell, Winchester (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 488 days.

(21) Appl. No.: 13/090,844

(22) Filed: Apr. 20, 2011

(65) Prior Publication Data
US 2012/0272252 A1 Oct. 25, 2012

(51) Int. Cl.
G06F 9/44 (2006.01)
G06F 9/54 (2006.01)

(52) U.S. Cl.
CPC ........................................ G06F 9/542 (2013.01)

(58) Field of Classification Search
None
See application file for complete search history.

(56) References Cited

U.S. PATENT DOCUMENTS

| | | | |
|---|---|---|---|
| 6,272,386 B1 | 8/2001 | McLaughlin et al. | |
| 6,359,557 B2 * | 3/2002 | Bilder | 340/531 |
| 6,421,570 B1 | 7/2002 | McLaughlin et al. | |
| 6,684,120 B1 | 1/2004 | Oku et al. | |
| 7,287,066 B2 | 10/2007 | Ruggaber et al. | |
| 7,376,092 B2 | 5/2008 | Yajnik et al. | |
| 7,530,078 B2 | 5/2009 | Collison et al. | |
| 7,822,801 B2 | 10/2010 | Zhao et al. | |
| 7,831,670 B2 | 11/2010 | Goodman et al. | |
| 7,865,550 B2 | 1/2011 | Lobban et al. | |
| 2003/0074482 A1 * | 4/2003 | Christensen et al. | 709/313 |
| 2005/0234917 A1 * | 10/2005 | Branham et al. | 707/10 |
| 2006/0248143 A1 * | 11/2006 | Collison et al. | 709/204 |
| 2007/0156898 A1 * | 7/2007 | Appleby et al. | 709/225 |
| 2008/0133337 A1 * | 6/2008 | Fletcher et al. | 705/10 |
| 2008/0244696 A1 | 10/2008 | Bhola et al. | |
| 2009/0048994 A1 * | 2/2009 | Applebaum et al. | 706/45 |
| 2009/0187635 A1 | 7/2009 | Lobban et al. | |
| 2010/0241583 A1 | 9/2010 | Garza et al. | |
| 2010/0306365 A1 | 12/2010 | Gale et al. | |

(Continued)

FOREIGN PATENT DOCUMENTS

SE WO 98/52340 * 11/1998 ............. H04M 3/46

OTHER PUBLICATIONS

S. Chaki, et al., Integrating Publish/Subscribe into a Mobile Teamwork Support Platform, Article, 2003, pp. 1-8, Published on the World Wide Web at: http://citeseerx.ist.psu.edu/viewdoc/download?doi=10.1.1.7.4821&rep=rep1&type=pdf.

(Continued)

*Primary Examiner* — Umut Onat
(74) *Attorney, Agent, or Firm* — Lee Law, PLLC; Christopher B. Lee

(57) ABSTRACT

A message published by a publisher device and associated with a subscription topic hosted by a publish/subscribe message tracking device is received at the publish/subscribe message tracking device. A determination is made to monitor action completion processing of the message by at least one subscriber device. The message is sent to the at least one subscriber device that is registered to the subscription topic and configured to report action completion processing of the message. The action completion processing of the message by the at least one subscriber device is monitored. Monitoring results of the monitored action completion processing are published.

24 Claims, 7 Drawing Sheets

(56) References Cited

U.S. PATENT DOCUMENTS

2012/0215856 A1 8/2012 Beardsmore et al.
2012/0215872 A1 8/2012 Beardsmore et al.
2012/0215873 A1 8/2012 Beardsmore et al.

OTHER PUBLICATIONS

Ovidiu Feodorov, JBoss Community: JBossMessagingCore, Webpage/site, Aug. 28, 2006, pp. 1-11, Red Hat, Inc., Published on the World Wide Web at: http://community.jboss.org/wiki/JBossMessagingCore.

Author Unknown, Wait until a change is made, Webpage/site, Mar. 25, 2010, pp. 1-9, Issue # 209, Redis, Published on the World Wide Web at: http://code.google.com/p/redis/issues/detail?id=209.

Rajunathan Rajkumar, et al., High Availability in the Real-Time Publisher/Subscriber Inter-Process Communication Model, Proceedings of the IEEE Real-Time Systems Symposium, Dec. 1996, pp. 136-141, Published online at: ftp://ftp.sei.cmu.edu/pub/documents/articles/pdf/rajkumar_96.pdf.

Guoli Li, et al., Composite Subscriptions in Content-Based Publish/Subscribe Systems, Proceedings of the 6th International Middleware Conference, Grenoble, France, Nov. 2005, pp. 1-20, Published online at: http://www.cs.toronto.edu/pub/gli/Middleware2005/Li-Composite%20Subscriptions%20in%20ContentBased%20Publish Subscribe%20Systems.pdf.

Yu Zhang, Composite Subscriptions in Content-Based Publish/Subscribe Systems, Presentation/article, Jan. 2007, pp. 1-34, Published online at: http://pdf.aminer.org/000/298/407/specifying_and_detecting_composite_events_in_content_based_publish_subscribe.pdf.

Somaya Arianfar, Optimizing Publish/Subscribe Systems with Congestion Handling, Thesis, Jun. 18, 2008, pp. i-66, Helsinki University of Technology, Published online at: http://nordsecmob.aalto.fi/en/publications/theses_2008/arianfar.pdf.

Yuanyuan Zhao, et al., Dynamic Access Control in a Content-based Publish/Subscribe System with Delivery Guarantees, Proceedings of the 26th IEEE International Conference on Distributed Computing Systems (ICDCS'06), 2006, p. 1 (Abstract only), Published online at: http://www.computer.org/csdl/proceedings/icdcs/2006/2540/00/25400060-abs.html.

* cited by examiner

US 9,372,739 B2

MONITORING OF SUBSCRIBER MESSAGE PROCESSING IN A PUBLISH/SUBSCRIBE MESSAGING ENVIRONMENT

RELATED APPLICATIONS

This application is related to U.S. patent application Ser. No. 13/031,224 titled "MESSAGE PUBLICATION FEEDBACK IN A PUBLISH/SUBSCRIBE MESSAGING ENVIRONMENT," which was filed in the U.S. Patent and Trademark Office on Feb. 20, 2011; this application is related to U.S. patent application Ser. No. 13/031,225 titled "CRITERIA-BASED MESSAGE PUBLICATION CONTROL AND FEEDBACK IN A PUBLISH/SUBSCRIBE MESSAGING ENVIRONMENT," which was filed in the U.S. Patent and Trademark Office on Feb. 20, 2011; and this application is related to U.S. patent application Ser. No. 13/031,226 titled "FAILURE-CONTROLLED MESSAGE PUBLICATION AND FEEDBACK IN A PUBLISH/SUBSCRIBE MESSAGING ENVIRONMENT," which was filed in the U.S. Patent and Trademark Office on Feb. 20, 2011, each of which is incorporated by reference in its entirety as if fully set forth herein.

BACKGROUND

The present invention relates publish/subscribe systems. More particularly, the present invention relates to monitoring subscriber message processing in a publish/subscribe messaging environment.

Publish/subscribe (pub/sub) systems allow information producing devices (e.g., publishers) to create topics. Message broker devices host the topics. Information consuming devices (e.g., subscribers) may subscribe to topics hosted by the message broker devices. Publishers may post messages to topics hosted by the message broker devices. The message broker devices may forward posted topic messages to each subscriber device that has subscribed to the topic.

BRIEF SUMMARY

A method includes receiving, at a publish/subscribe message tracking device, a message published by a publisher device and associated with a subscription topic hosted by the publish/subscribe message tracking device; determining to monitor action completion processing of the message by at least one subscriber device; sending the message to the at least one subscriber device that is registered to the subscription topic and configured to report action completion processing of the message; monitoring the action completion processing of the message by the at least one subscriber device; and publishing monitoring results of the monitored action completion processing.

A system includes a communication module; and a processor programmed to receive, via the communication module, a message published by a publisher device and associated with a hosted subscription topic; determine to monitor action completion processing of the message by at least one subscriber device; send, via the communication module, the message to the at least one subscriber device that is registered to the subscription topic and configured to report action completion processing of the message; monitor the action completion processing of the message by the at least one subscriber device; and publish monitoring results of the monitored action completion processing.

A computer program product includes a computer readable storage medium including computer readable program code, where the computer readable program code when executed on a computer causes the computer to receive a message published by a publisher device and associated with a hosted subscription topic; determine to monitor action completion processing of the message by at least one subscriber device; send the message to the at least one subscriber device that is registered to the subscription topic and configured to report action completion processing of the message; monitor the action completion processing of the message by the at least one subscriber device; and publish monitoring results of the monitored action completion processing.

DETAILED DESCRIPTION

Figure 1:
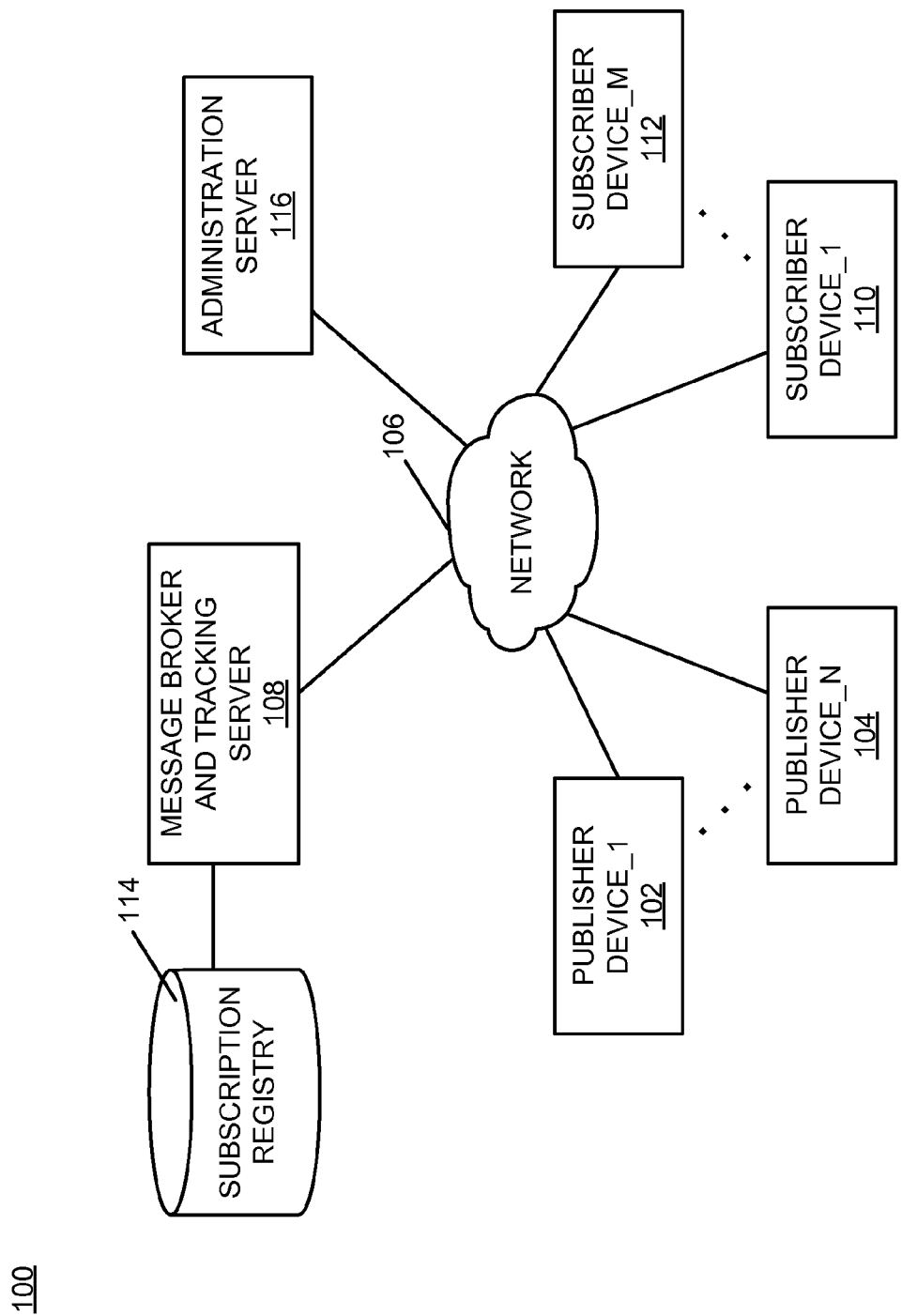
FIG. 1 is a block diagram of an example of an implementation of a system for monitoring of subscriber message processing in a publish/subscribe messaging environment according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides monitoring of subscriber message processing in a publish/subscribe messaging environment. Monitoring of subscriber device (e.g., destination) processing of messages in a publish/subscribe environment/system as described herein involves tracking processing (e.g., action completion) of one or more published messages by one or more subscriber devices and publishing tracked processing and/or action completion results to the publisher device and/or administrator devices or other devices configured for subscriber message processing notifications. Messages delivered to subscribers may be configured with one or more report destination identifiers that indicate one or more devices to which to report message processing information in response to internal processing of message(s) received by subscriber devices. Both positive and negative action completion notifications (e.g., PACN/NACN) may be generated by subscriber devices to communicate successful/unsuccessful completion, respectively, of processing of action(s) requested, instructed, or configured in association with messages delivered to subscriber devices. Message processing and action completion status may also be provided using the technology described herein as appropriate for a given implementation.

Hereinafter, publish/subscribe environments or systems may be referred to as "pub/sub" environments or systems for convenience. It should be noted that the phrases "subscriber message processing," "action completion processing," or similar phrases utilized herein refer to internal subscriber device message processing for consumption and action completion based upon content of messages as opposed to processing for delivery or receipt of messages. As such, delivery confirmation and delivery monitoring is distinguishable from the monitoring of subscriber message processing in a publish/subscribe messaging environment described herein. Additionally, the term "processing" associated with messages at subscriber devices may be used interchangeably with the term "action completion" herein, as convenient for the particular examples provided below. Further, "subscriber devices" may include any form of device suitable for use as a subscriber in publish/subscribe systems or environments, including embedded devices (e.g., heart monitors, train/railway track monitors, etc.) used in telemetry applications or other embedded applications, or non-embedded devices as appropriate for a given implementation.

Tracking processing and/or action completion of one or more published messages by one or more subscriber devices may include several variations of technology and technological permutations. For example, subscriber devices may inform messaging engines asynchronously when the subscriber devices consider messages to be either completely processed or that processing of a particular message has failed. Alternatively, a new application programming interface (API) call may be utilized to allow subscriber devices to provide action completion notifications to messaging engines. As another alternative, subscriber devices may put/place action report messages onto message destinations (e.g., queues) read by messaging engines. As a further alternative, subscriber devices may perform a "get" of subscribed messages transactionally (e.g., as a transaction with a messaging engine), and the messaging engine may treat published messages that are read as successfully processed when the transaction is committed by the subscriber device. As yet another alternative, tracking of processing and/or action completion of one or more published messages by one or more subscriber devices may be performed by a combination of the above example implementations. Status of failed or partially-completed message processing by subscriber devices may also be conveyed to a messaging engine via any suitable mechanism. Many other variations on tracking processing and/or action completion of one or more published messages by one or more subscriber devices are possible and all are considered within the scope of the present subject matter.

Publishing tracked processing and/or action completion results to the publisher device and/or administrator devices or other devices configured for subscriber message processing notifications may also include several variations of technology and technological permutations. For example, an action report message may either be placed on/sent to a queue that may be specified by the publisher device within the message, to an administrator, or to other devices configured for subscriber message processing notifications. Alternatively, topic-based processing may be utilized and action report messages may be published by subscriber devices to a report topic using message identifiers (e.g., /publicationreports/msg/<msgid>). The report topic may be subscribed to by publisher devices and administration devices and action report messages may be distributed under one or more such subscriptions. As another alternative, an action report message may be provided to callers of a new reporting API call that the publisher device calls to receive action completion notifications. As a further alternative, the action completion notifications and/or information may be exposed/provided by a combination of the above example implementations. Again, status of failed or partially-completed message processing by subscriber devices may also be published by a messaging engine via any suitable mechanism. Many other variations on publishing tracked processing and/or action completion results to the publisher device and/or administrator devices or other devices configured for subscriber message processing notifications are possible and all are considered within the scope of the present subject matter.

Information provided in association with publishing tracked processing and/or action completion results may include several information elements. For example, a unique identifier (e.g., a message identifier (ID)) associating a specific report with a message published by a publisher device may be used in association with action report messages generated by subscriber devices to report action completion information. Additionally or alternatively, a total number of subscribers eligible to receive published messages (e.g., subscribing to the specified topic and meeting all other requirements—e.g. message "selectors") may be maintained by messaging engines and a total number of subscriber devices that have successfully processed a message may be reported. A total number of subscriber devices that have attempted to process the message but failed may also be tracked and reported. A total number of subscriber devices that have yet to process a message may be tracked and reported.

The action report messages may be forwarded by a messaging engine to one or more configured recipients of action completion notifications or action report messages from multiple subscriber devices and may be aggregated into a combined/aggregated action report message to reduce bandwidth and processing requirements at both a message engine and at configured recipients of action completion notifications.

This action reporting may further be configured based upon other criteria, such as device type/configuration or other criteria as appropriate for a given implementation. For example, tracking and reporting of action completion by subscriber devices may be configured based upon whether subscriber devices are configured for durable (e.g., to receive all messages for a topic) or non-durable subscriptions (e.g., to only receive messages when actively connected and able to receive messages). Additionally, tracking and reporting of action completion by subscriber devices may be configured for subscriber devices that are registered at message publication time or for subscriber devices that are sent retained publication messages to provide additional granularity. Further, tracking and reporting of action completion by subscriber devices may be configured based upon whether subscriber devices are currently connected to the messaging engine, or alternatively whether subscriber devices are not currently connected to the messaging engine. As another configuration alternative, an "importance rating" may be implemented such that if a subscriber device is configured with an "importance" rating or other tag or a particular level, the subscriber action report information may be included into a report. Any error information associated with delivery to this subscriber (e.g., subscriber input queue full) may be reported. As such, a variety of statistics may be maintained and reported and message tracking filtering based upon a variety of criteria may be implemented as appropriate for a given implementation. Message tracking filtering may reduce processing bandwidth and overhead for certain implementations.

Determining what information to report for each published message and when to report on the processing/action completion status for a published message may be complicated by several factors. For example, a time taken by subscriber devices to process a published message may be unbounded. Further, a time taken by different subscriber devices to process the same published message may be different. As such, action report messages may be generated at a fixed time after publication of a message by either the messaging engine and/or the subscriber device(s). Action report messages may also be generated repeatedly at fixed time intervals, in response to changes of any information associated with action reporting, or in direct response to a request for the information via an API call. Many other variations on what information to report for each published message and when to report on the processing/action completion status for a published message may be implemented as appropriate for a given implementation.

Tracking and publication of subscriber message processing/action completion status may be configured dynamically (e.g., enabled/disabled), such as via configuration settings (e.g., one or more configuration flags) associated with a messaging engine and/or subscriber devices. Because of the performance overhead of such monitoring, performance may be improved by processing certain published messages using a variety of statistical message selection variations, as described above. Dynamic enablement of tracking and publication of subscriber message processing/action completion status may be turned on and off (e.g., enabled/disabled, respectively) by publisher devices (e.g., by setting/clearing a flag at message publication), such as via data associated with a published message. Publisher devices may be configured with a tracking and publication privilege rating, such that only privileged publisher devices of a certain publication privilege rating may be allowed to set the flag and enable tracking and publication. The publication privilege rating may be dynamically adjustable based upon message traffic, processor consumption, or other factors as appropriate for a given implementation. Alternatively, dynamic enablement of tracking and publication of subscriber message processing/action completion status may be set/configured by the administrator based upon a variety of criteria, such as all publications above/below a certain priority level, mission critical/urgent versus non-mission critical/urgent messages, telemetry applications/data versus non-real-time critical applications/data, etc. Dynamic enablement of tracking and publication of subscriber message processing/action completion status may be inferred by a messaging engine and/or subscriber devices from other setting (e.g., all messages published with a "quality of service" greater than a threshold, etc.).

The tracking and publication of subscriber message processing/action completion status information may be consumed by the publishing application. However, it should also be noted that a monitoring tool/device may be implemented for administrative use to check on the status of particularly important publications, for statistical metrics of publication processing, and for other uses as appropriate for a given implementation. Notifications of statistics and/or message processing failures may be made to a user/administrator to allow appropriate corrective action for unprocessed or unsuccessfully processed publications.

It should be noted that conception of the present subject matter resulted from recognition of certain limitations associated with conventional pub/sub systems and messaging environments. For example, the present subject matter improves pub/sub systems and messaging environments by providing for subscriber acknowledgement of processing/action completion by subscriber devices through a variety of acknowledgement mechanisms, as described above and in more detail below. As such, improved end-to-end information flow regarding message processing/action completion within pub/sub systems and messaging environments may be obtained through positive and negative action completion notifications (PACN/NACN) from subscriber devices using a variety of acknowledgement techniques. Configuration of reporting granularity may be adjusted as appropriate for bandwidth, processor consumption, message priority, or other factors as appropriate for a given implementation.

The monitoring of subscriber message processing in a publish/subscribe (pub/sub) messaging environment described herein may be performed in real time to allow prompt monitoring of message processing by subscriber devices. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for monitoring of subscriber message processing in a publish/subscribe messaging environment. A publisher device_1 102 through a publisher device_N 104 communicate via a network 106 with a message broker and tracking server 108 to create topics for publication of messages via a publish/subscribe mechanism. For purposes of the present description, the message broker and tracking server 108 may alternatively be referred to generally as a "publish/subscribe message tracking device." A subscriber device_1 110 through a subscriber device_M 112 also communicate via the network 106 with the message broker and tracking server 108 to subscribe to topics hosted by the message broker and tracking server 108. The message broker and tracking server 108 maintains a subscription registry database 114 for processing subscriptions and message distribution associated with subscriptions. As such, the message broker and tracking server 108 operates as a message brokering server for publish/subscribe message processing. The message broker and tracking server 108 also operates as a message tracking server that provides action completion notifications to the respective publisher devices 102 through 104 that post messages to topics. As described above and in more detail below, the message broker and tracking server 108 may notify the respective publisher devices 102 through 104 that post messages to topics of message processing completion and message processing status. The message broker and tracking server 108 may also notify an administration server 116 of message processing completion and message processing status in response to configuration and monitoring requests from the administration server 116. The message broker and tracking server 108 may additionally be configured by the administration server 116, as described above and in certain examples below.

As will be described in more detail below in association with FIG. 2 through FIG. 6, the message broker and tracking server 108 provides automated monitoring of subscriber message processing in a publish/subscribe messaging environment, such as the system 100. The automated monitoring of subscriber message processing in a publish/subscribe messaging environment is based upon coordinating processing confirmation responses from subscriber devices, such as any of the subscriber device_1 110 through the subscriber device_M 112. The automated monitoring of subscriber message processing in a publish/subscribe messaging environment may be implemented in a variety of technological permutations. Several example technological permutations have been described above and certain of those examples are described in more detail below. It is understood that many other possibilities exist for monitoring of subscriber message processing in a publish/subscribe messaging environment and all are considered within the scope of the present subject matter.

It should be noted that the message broker and tracking server 108, the subscriber device_1 110 through the subscriber device_M 112, the publisher device_1 102 through the publisher device_N 104, and the administration server 116 may be any computing device capable of processing information as described above and in more detail below. Further, these devices may be portable computing devices, either by a user's ability to move the respective devices to different locations, or by the respective devices' association with a portable platform, such as a plane, train, automobile, or other moving vehicle. For example, the message broker and tracking server 108, the subscriber device_1 110 through the subscriber device_M 112, the publisher device_1 102 through the publisher device_N 104, and the administration server 116 may include devices such as a personal computer (e.g., desktop, laptop, etc.) or a handheld device (e.g., cellular telephone, personal digital assistant (PDA), email device, music recording or playback device, etc.), or any other device capable of processing information as described in more detail below. Further, the subscriber device_1 110 through the subscriber device_M 112 may include telemetry devices, such as embedded heart monitors, train/railway track monitors, and other devices used in telemetry-type applications or non-embedded devices as appropriate for a given implementation.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

Figure 2:
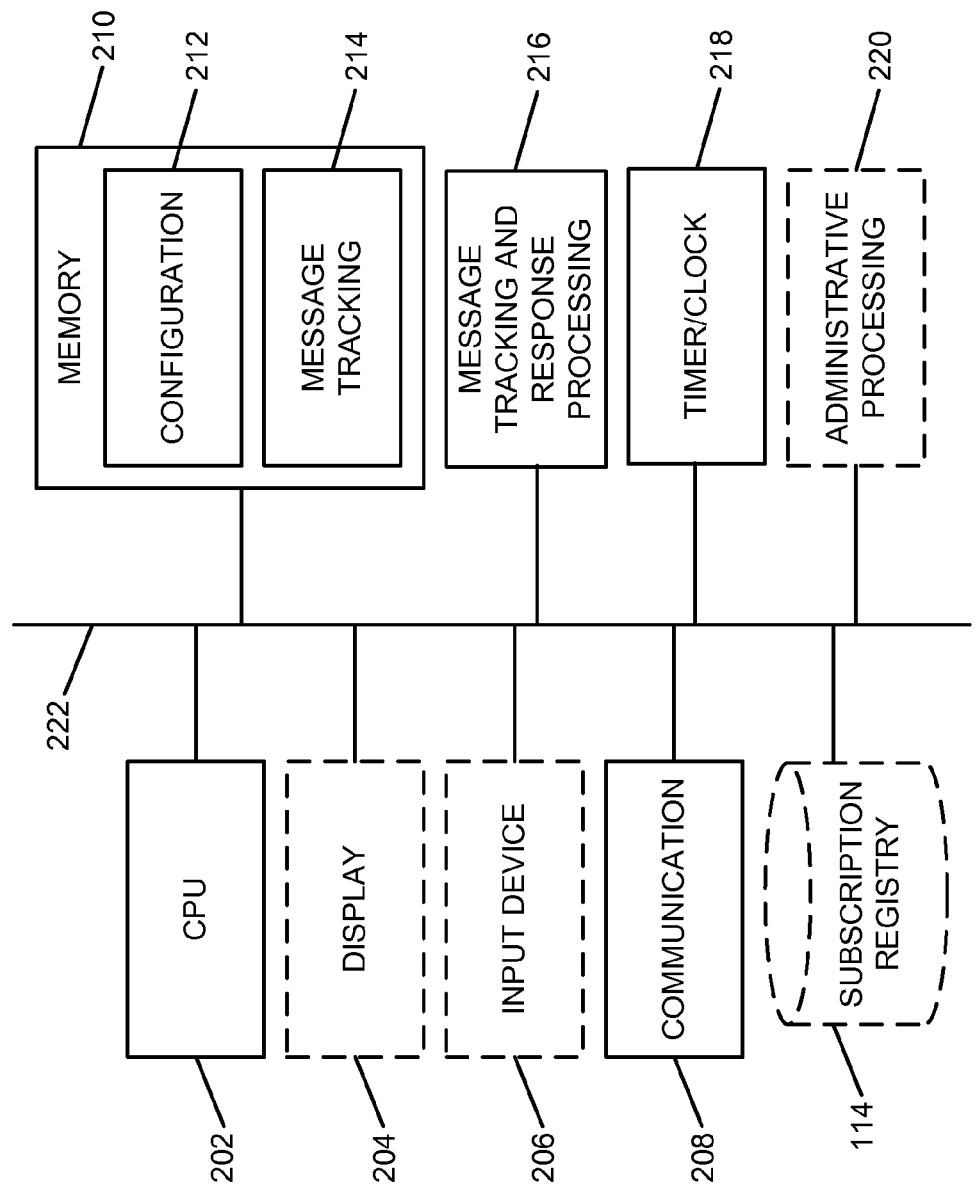
FIG. 2 is a block diagram of an example of an implementation of a core processing module capable of performing automated monitoring of subscriber message processing in a publish/subscribe messaging environment according to an embodiment of the present subject matter.

FIG. 2 is a block diagram of an example of an implementation of a core processing module 200 capable of performing automated monitoring of subscriber message processing in a publish/subscribe messaging environment. The core processing module 200 may be associated with any of the devices of FIG. 1, including the message broker and tracking server 108, the subscriber device_1 110 through the subscriber device_M 112, the publisher device_1 102 through the publisher device_N 104, and the administration server 116, as appropriate for a given implementation. Further, the core processing module 200 may provide different and complementary processing for monitoring of subscriber message processing in a publish/subscribe messaging environment in association with each implementation, as described in more detail below. A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, or any other type of input device by which the user may interact with and respond to information on the display 204.

It should be noted that the display 204 and the input device 206 are illustrated with a dashed-line representation within FIG. 2 to indicate that they may be optional components for the core processing module 200 for certain implementations. Accordingly, the core processing module 200 may operate as a completely automated embedded device without direct user configurability or feedback. However, the core processing module 200 may also provide user feedback and configurability via the display 204 and the input device 206, respectively.

A communication module 208 provides interconnection capabilities that allow the core processing module 200 to communicate with other modules within a system, such as the system 100 of FIG. 1. The communication module 208 may include any electrical, protocol, and protocol conversion capabilities useable to provide the interconnection capabilities. Though the communication module 208 is illustrated as a component-level module for ease of illustration and description purposes, it should be noted that the communication module 208 may include any hardware, programmed processor(s), and memory used to carry out the functions of the communication module 208 as described above and in more detail below. For example, the communication module 208 may include additional controller circuitry in the form of application specific integrated circuits (ASICs), processors, antennas, and/or discrete integrated circuits and components for performing communication and electrical control activities associated with the communication module 208. Additionally, the communication module 208 may include interrupt-level, stack-level, and application-level modules as appropriate. Furthermore, the communication module 208 may include any memory components used for storage, execution, and data processing for performing processing activities associated with the communication module 208. The communication module 208 may also form a portion of other circuitry described without departure from the scope of the present subject matter.

A memory 210 includes a configuration storage area 212 that stores configuration information for subscriber message processing tracking and reporting. The configuration information may include information regarding configured recipients of (e.g., publisher devices, administration devices, etc.) and outstanding requests for action completion notifications. The configuration information may also include information regarding subscriber device configurations, message type configurations that identify message types for tracking, or other indicia for identifying which messages to track and/or subscriber devices to monitor for message processing completion, as described above and in more detail below. The configuration information may further include information for dynamically enabling and disabling one or more configuration options, such as configuration settings (e.g., one or more configuration flags).

The memory 210 also includes a message tracking storage area 214 that stores message tracking information, such as subscriber messages, message routing information for outstanding (e.g., currently tracked/monitored) subscriber messages, message identifiers for messages that are configured for monitoring, message processing reports (e.g., action report messages), message tracking timing parameters (e.g., action report generation periodicity or time intervals), message processing statistics, message queues for received messages and messages sent to other devices, or other message tracking information as appropriate for a given implementation. The message tracking information may also include quality of service (QOS) parameters and results.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A message tracking and response processing module 216 is also illustrated. The message tracking and response processing module 216 provides message management and processing completion coordination with one or more devices that implement the core processing module 200, as described above and in more detail below. The message tracking and response processing module 216 implements the automated monitoring of subscriber message processing in a publish/subscribe (pub/sub) messaging environment of the core processing module 200.

Though the message tracking and response processing module 216 is illustrated as a component-level module for ease of illustration and description purposes, it should be noted that the message tracking and response processing module 216 may include any hardware, programmed processor(s), and memory used to carry out the functions of this module as described above and in more detail below. For example, the message tracking and response processing module 216 may include additional controller circuitry in the form of application specific integrated circuits (ASICs), processors, and/or discrete integrated circuits and components for performing communication and electrical control activities associated with the respective devices. Additionally, the message tracking and response processing module 216 may include interrupt-level, stack-level, and application-level modules as appropriate. Furthermore, the message tracking and response processing module 216 may include any memory components used for storage, execution, and data processing for performing processing activities associated with the module.

It should also be noted that the message tracking and response processing module 216 may form a portion of other circuitry described without departure from the scope of the present subject matter. Further, the message tracking and response processing module 216 may alternatively be implemented as an application stored within the memory 210. In such an implementation, the message tracking and response processing module 216 may include instructions executed by the CPU 202 for performing the functionality described herein. The CPU 202 may execute these instructions to provide the processing capabilities described above and in more detail below for the core processing module 200. The message tracking and response processing module 216 may form a portion of an interrupt service routine (ISR), a portion of an operating system, a portion of a browser application, or a portion of a separate application without departure from the scope of the present subject matter.

A timer/clock module 218 is illustrated and used to determine timing and/or date information, such as a timing for action completion notifications and other timing aspects, as described above and in more detail below. As such, the message tracking and response processing module 216 may utilize information derived from the timer/clock module 218 for information processing activities, such as the monitoring of subscriber message processing in a publish/subscribe messaging environment described herein.

An administrative processing module 220 is also shown. As described above, the core processing module 200 may be implemented in association with any of the devices described within FIG. 1, as appropriate for a given implementation. The administrative processing module 220 provides for configuration of a core processing module, such as the core processing module 200 of the message broker and tracking server 108, and provides one example of a device for alternative action completion reporting (e.g., other than reporting to publisher devices) as described above and in more detail below. Other alternative action completion reporting scenarios are possible and all are considered within the scope of the present subject matter. The administrative processing module 220 may be utilized, for example, by the administration server 116 to configure the monitoring of subscriber message processing in a publish/subscribe messaging environment described herein. Alternatively, the administrative processing module 220 may be implemented in association with the message broker and tracking server 108 for self-configuration and/or administrative interaction and processing. The administrative processing module 220 is shown in a dashed-line representation within FIG. 2 to indicate that it may be an optional component for the core processing module 200 for certain implementations.

The subscription registry database 114 is also shown in association with the core processing module 200 and provides storage capabilities for information as described above. The subscription registry database 114 is also shown in a dashed-line representation within FIG. 2 to indicate that it may be an optional component for the core processing module 200 for certain implementations. For example, the message broker and tracking server 108 may incorporate the subscription registry database 114 within the core processing module to improve access and performance. Alternatively, the message broker and tracking server 108 may access the subscription registry database 114 as an external device, such as shown within FIG. 1, or may access the subscription registry database 114 via a network connection, such as the network 106.

The CPU 202, the display 204, the input device 206, the communication module 208, the memory 210, the message tracking and response processing module 216, the timer/clock module 218, the administrative processing module 220, and the subscription registry database 114 are interconnected via an interconnection 222. The interconnection 222 may include a system bus, a network, or any other interconnection capable of providing the respective components with suitable interconnection for the respective purpose.

While the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that the information stored within the subscription registry database 114 may also be stored within the memory 210 without departure from the scope of the present subject matter. Accordingly, the core processing module 200 may take many forms and may be associated with many platforms.

FIG. 3 through FIG. 6 below describe example processes that may be executed by devices, such as the devices described in association with FIG. 1, to perform the automated monitoring of subscriber message processing in a publish/subscribe (pub/sub) messaging environment associated with the present subject matter. Many other variations on the example processes are possible and all are considered within the scope of the present subject matter. The example processes may be performed by modules, such as the message tracking and response processing module 216 of the core processing module 200 and/or executed by the CPU 202 associated with such devices. It should be noted that time out procedures and other error control procedures are not illustrated within the example processes described below for ease of illustration purposes. However, it is understood that all such procedures are considered to be within the scope of the present subject matter.

Figure 3:
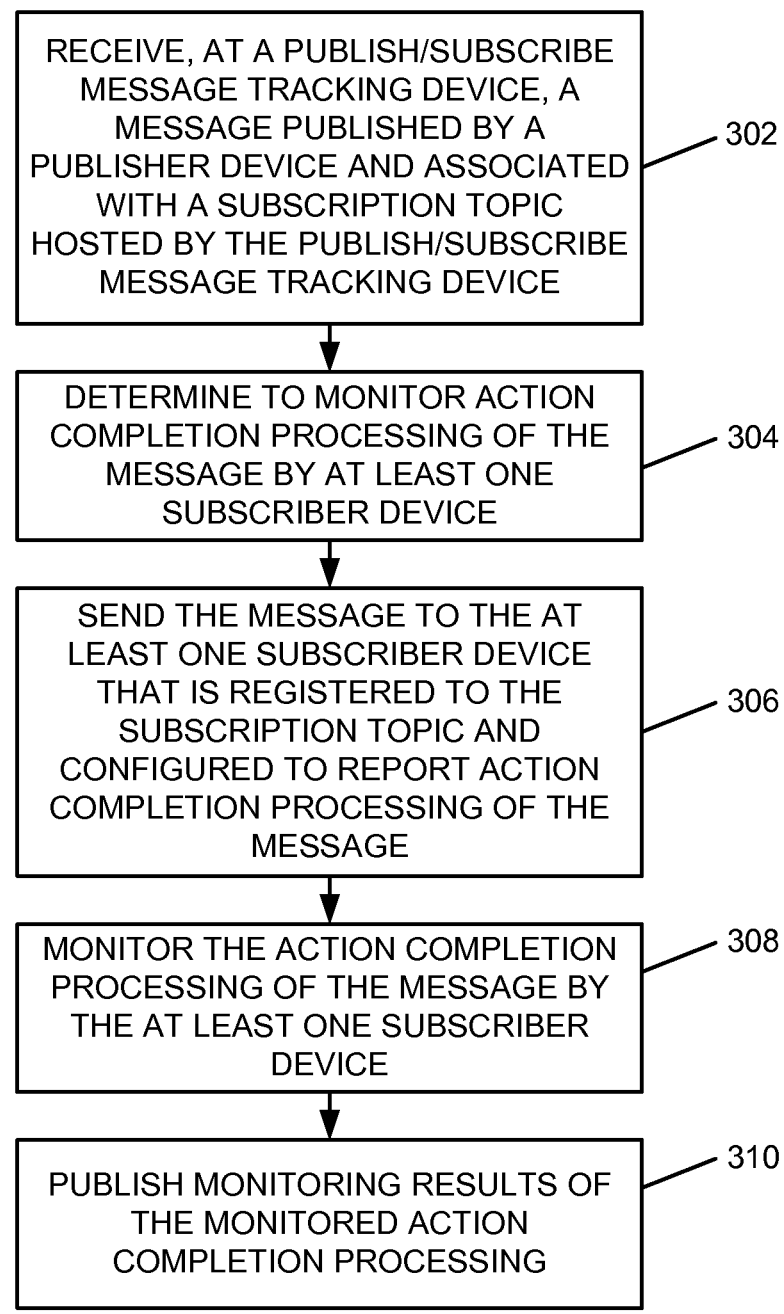
FIG. 3 is a flow chart of an example of an implementation of a process for automated monitoring of subscriber message processing in a publish/subscribe (pub/sub) messaging environment according to an embodiment of the present subject matter.

FIG. 3 is a flow chart of an example of an implementation of a process 300 for automated monitoring of subscriber message processing in a publish/subscribe (pub/sub) messaging environment. At block 302, the process 300 receives, at a publish/subscribe message tracking device, a message published by a publisher device and associated with a subscription topic hosted by the publish/subscribe message tracking device. At block 304, the process 300 determines to monitor action completion processing of the message by at least one subscriber device. At block 306, the process 300 sends the message to the at least one subscriber device that is registered to the subscription topic and configured to report action completion processing of the message. At block 308, the process 300 monitors the action completion processing of the message by the at least one subscriber device. At block 310, the process 300 publishes monitoring results of the monitored action completion processing.

Figure 4A:
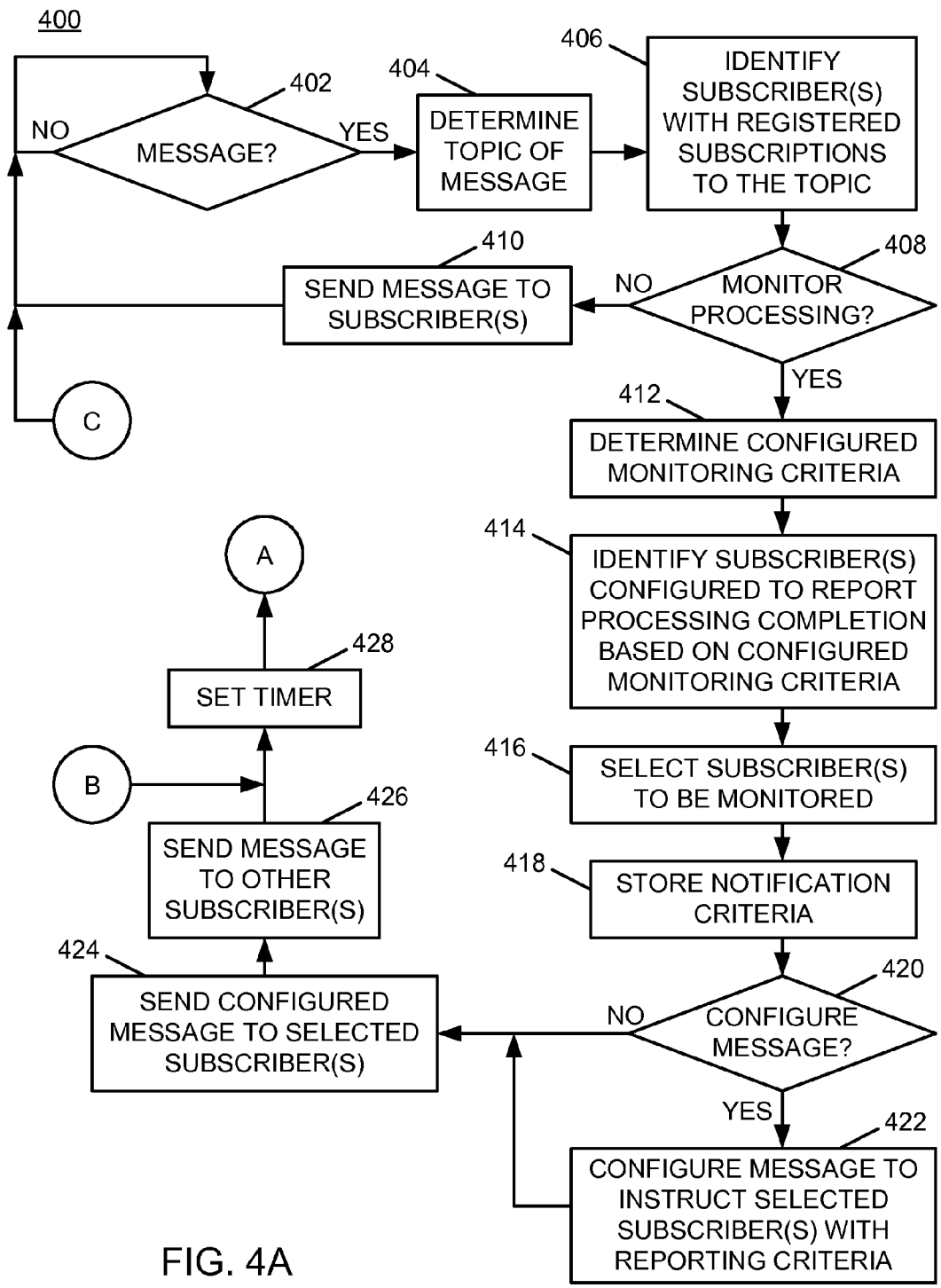
FIG. 4A is a flow chart of an example of an implementation of initial processing within a process for automated monitoring of subscriber message processing in a publish/subscribe (pub/sub) messaging environment by a publish/subscribe message tracking device according to an embodiment of the present subject matter.
Figure 4B:
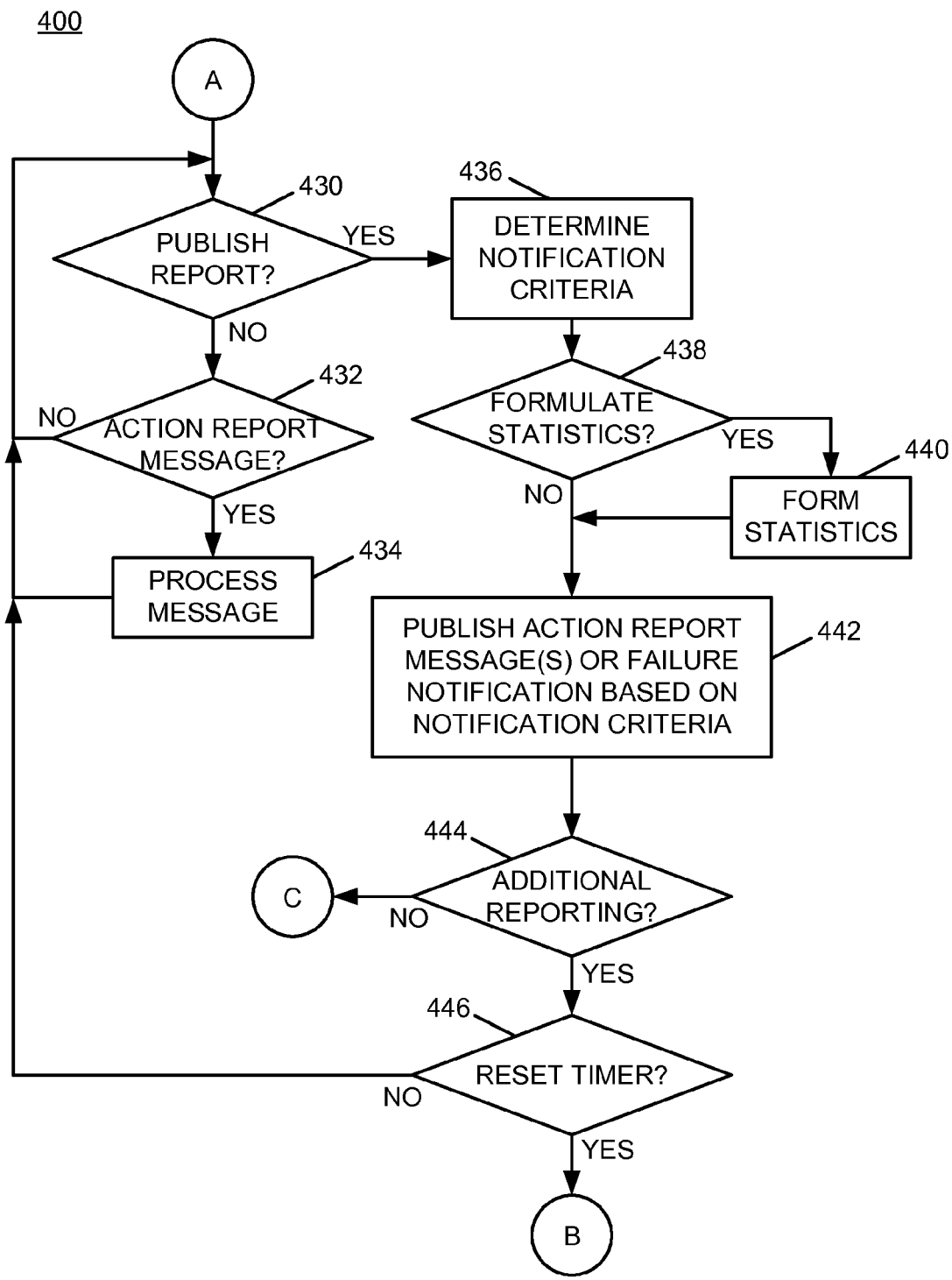
FIG. 4B is a flow chart of an example of an implementation of additional processing within a process for automated monitoring of subscriber message processing in a publish/subscribe (pub/sub) messaging environment by a publish/subscribe message tracking device according to an embodiment of the present subject matter.

FIGS. 4A-4B illustrate a flow chart of an example of an implementation of a process 400 for automated monitoring of subscriber message processing in a publish/subscribe (pub/sub) messaging environment by a publish/subscribe message tracking device, such as the message broker and tracking server 108. FIG. 4A illustrates initial processing within the process 400. It should be noted that the process 400 represents one example thread of processing for a single message. Multiple threads may be used with a separate thread to process each message or a single thread may be used for all messages as appropriate for a given implementation. At decision point 402, the process 400 makes a determination as to whether a published message has been received from a publisher device, such as one of the publisher device_1 102 through the publisher device_N 104. At block 404, the process 400 determines a topic of the message. At block 406, the process 400 identifies subscriber devices, such as the subscriber device_1 110 through the subscriber device_M 112, that have a subscription to the topic.

At decision point 408, the process 400 makes a determination as to whether to monitor action completion processing of the message by subscriber devices. This determination may be made, for example, based upon subscriber device types (e.g., telemetry devices, etc.), whether certain subscribers to the topic are configured to process requests for action completion notifications, whether message processing monitoring is configured/enabled at the message broker and tracking server, whether the message includes an indicator added by the publisher device requesting monitoring of action completion by subscriber devices, or any other factor appropriate for a given implementation. This determination may further be made based upon an indicator or indicia within the message itself indicating that the publisher device has requested monitoring of action completion by one or more subscriber devices. Subscriber devices may be indicated within the indicia based upon subscriber device types, topic, or any other indicia appropriate for a given implementation.

In response to determining at decision point 408 not to monitor action completion processing of the message by subscriber devices, the process 400 sends the message to the subscriber devices that are registered/subscribed to the subscription topic at block 410 and returns to decision point 402 and iterates as described above. In response to determining at decision point 408 to monitor action completion processing of the message by subscriber devices, the process 400 determines any configured monitoring criteria at block 412. Configured monitoring criteria may include, for example, a proportion/percentage of subscribed devices to monitor, a criticality level of messaging to certain subscriber devices, whether to monitor message processing by durable subscriber devices that may presently be off-line, whether to monitor processing only for subscriber devices that are registered at the time of publication versus those devices that are sent retained publication messages, whether subscriber devices are currently connected to the message broker and tracking server, subscriber features such as an "importance" rating or other factor associated with subscriber devices, or any other factor appropriate for a given implementation. As such, the process 400 may determine that at least one subscriber device configured to report action completion processing of the message includes a subscriber device that is at least one of configured for durable subscription message delivery and currently connected to the message broker and tracking server for subscription processing.

At block 414, the process 400 identifies subscriber devices configured to report processing completion based upon the configured monitoring criteria. At block 416, the process 400 selects subscriber devices from the configured subscriber devices to be monitored for message processing completion. As such, the process 400 may select a subset of available configured subscriber devices for message processing completion monitoring. As described above, selecting a subset of possible devices to monitor may assist with reducing processing or bandwidth, such as for example with messages of lower criticality or for subscriber devices with a lower importance level.

At block 418, the process 400 stores notification criteria for the message. Notification criteria may include an identifier of the publisher devices that sent the message so that that publisher device may be notified of message processing completion and status. Additionally, other devices, such as the administration server 116, may be configured to receive notifications of message processing completion and status. These additional or alternative devices may be identified within data created by the publisher device that published the message and sent as part of the message or may be a configuration option at the publish/subscribe message tracking device that may be enabled for example by such an administration device.

At decision point 420, the process 400 makes a determination as to whether to configure the message to instruct the selected subscriber devices to report message processing completion and status. It should be noted that the message may already be configured to instruct subscriber devices to issue report messages by the publisher device that published the message. As such, the process 400 may determine whether the message includes an indicator requesting monitoring of action completion by subscriber devices added by the publisher device. Alternatively or additionally, the publish/subscribe message tracking device may add additional reporting instructions to the message. It should be noted that the determination at decision point 420 may be considered optional and affirmative processing responsive to such a determination may be omitted for certain implementations. For example, for a two-phase transaction protocol implementation, subscribers may already be configured for transaction processing to get messages and then perform a commit as part of the transaction in response to completion of message processing. In such an implementation, the decision point 420 and any affirmative processing may be omitted.

In response to determining to configure the message to instruct the selected subscriber devices to report message processing completion and status, the process 400 configures the message with an instruction to report the action completion processing of the message and action completion processing report criteria to instruct the selected subscriber devices to report message processing completion and status at block 422. The action completion processing report criteria may include time-based constraints, such as a fixed time after publication, fixed time intervals, when any of the information in the report changes, or any other action completion processing report messaging constraint appropriate for a given implementation. As such, monitoring the action completion processing of the message by subscriber devices may include monitoring the action completion processing of the message based upon the configured action completion processing report criteria. It should be noted that reporting by subscriber devices may be configured to instruct the subscriber devices to invoke an API call for status reporting or via any other messaging interface as appropriate for a given implementation without departure from the scope of the present subject matter.

It should further be noted that any subscriber devices that are not capable of reporting message processing completion and status may ignore the instruction and process messages as they are configured to process messages, or subscriber devices that are not configured for report processing may be sent messages with configuration instruction either removed (if from the publisher device) or not inserted by the publish/subscribe message tracking device. As such, the present subject matter may be integrated into systems with legacy devices without impact on other devices.

In response to completion of configuring the message at block 422 or in response to determining at decision point 420 not to configure or further configure the message, the process 400 sends the configured message to the selected subscriber devices that are designated to report message processing completion and status at block 424. It should be noted that sending the configured message to the configured devices may include sending the configured message to at least one subscriber device as a two-phase commit protocol implementation of the automated monitoring of subscriber message processing in a publish/subscribe (pub/sub) messaging environment described herein. As such, the process 400 may send the message a subscriber device that is registered to the topic and configured to report action completion processing of the message by sending the message to at least one subscriber device as a two-phase commit transaction. In such an implementation, monitoring the action completion processing of the message by a subscriber device may include receiving an action report message from the subscriber device that includes a commit status indicating the action completion processing by at least one subscriber device, where the commit status includes a commit indicator or a rollback indicator. Alternatively, status may be provided by the respective subscriber devices as described in more detail below.

At block 426, the process sends the message to other subscriber devices (e.g., non-selected devices or legacy devices). At block 428, the process 400 sets a timer, such as the timer/clock module 218. The process 400 transitions to the processing shown and described in association with FIG. 4B.

FIG. 4B illustrates additional processing associated with the process 400 for automated monitoring of subscriber message processing in a publish/subscribe (pub/sub) messaging environment by a publish/subscribe message tracking device, such as the message broker and tracking server 108. At block 430, the process 400 makes a determination as to whether to publish a report for action completion processing by subscriber devices. This determination may be made, for example, based upon receipt of an action completion report message from a subscriber device, completion of statistical processing across a set of subscriber devices, a timeout of the timer, or any other factor appropriate for a given implementation. For purposes of the present example, it is assumed that a determination to publish a report for action completion processing by subscriber devices has not yet been made.

In response to determining not to publish a report for action completion processing by subscriber devices at decision point 430, the process 400 makes a determination at decision point 432 as to whether an action report message has been received from at least one monitored subscriber device. It should be noted as described above that a message may be received as published by a subscriber device to an action completion processing report topic. As also described above, action report messages may be received in association with action reporting application programming interface (API) calls including a status (e.g., completed, processing pending, etc.) of the action completion processing by the at least one subscriber device, in association with a commit portion of a two-phase commit transaction for action report messaging, or any other technology as appropriate for a given implementation. In response to determining at decision point 432 that no action report messages have been received, the process 400 returns to decision point 430 and iterates as described above. In response to determining at decision point 432 that at least one action report message has been received, the process 400 processes the message at 434 and returns to decision point 430 and iterates as described above.

Returning to the description of decision point 430, in response to determining to publish a report for action completion processing by one or more subscriber devices, the process 400 determines notification criteria, such as notification criteria stored in association with block 418 described above, at block 436. At decision point 438, the process 400 makes a determination as to whether to formulate any statistics related to the subscriber message processing completion. For example, the process 400 may determine a total number of subscribers that have successfully completed processing of the message, a total number of subscribers that have attempted but failed to complete processing of the message, and a total number of subscribers that have not yet completed processing of the message, average processing times, or any other mathematical indicia appropriate for reporting within a given implementation. In response to determining to formulate statistics related to the subscriber message processing completion at decision point 438, the process 400 forms the configured statistics at block 440.

In response to forming the configured statistics at block 440 or in response to determining at decision point 438 not to form statistics, the process 400 publishes the monitoring results (e.g., action report messages or failure notifications) based upon the notification criteria (e.g., destination for report messages) of the monitored action completion processing at block 442. Publishing the monitoring results may include, for example, sending the monitoring results as an action report message to a first message queue specified within the original message by the publisher device, and publishing the monitoring results to a report topic subscribed to by the publisher device and designated for publication of report messages. As another alternative, for implementations where reports are to be published to multiple entities (e.g., the message publisher and another device such as an administration device), publishing of the monitoring results may include determining whether at least one other device is designated to receive published monitoring results and sending the monitoring results as an action report message to a second message queue accessible to an administration device in response to determining that the first message queue is not accessible to the administration device. Publishing the monitoring results may further include providing the monitoring results to callers of an action reporting application programming interface (API), where the callers include the publisher device and an administration device, or other forms of publication as appropriate for a given implementation. The published monitoring results may include, for example, a unique identifier associating the publishing monitoring results with the message, a total number of subscriber devices eligible to receive the message, a total number of subscribers that have successfully processed the message, a total number of subscriber that have attempted to process the message but failed, and a total number of subscribers that have yet to process the message, or any other information appropriate for a given implementation.

At decision point 444, the process 400 makes a determination as to whether any additional reports will be issued, such as where an incremental or intermediate report has been issued at block 442. In response to determining at decision point 444 that additional reporting will be performed, the process 400 makes a determination at decision point 446 as to whether to reset the timer. In response to determining not to reset the timer, the process 400 returns to decision point 430 and iterates as described above. In response to determining to reset the timer at block 446, the process 400 returns to the processing associated with FIG. 4A at block 428 and iterates as described above. In response to determining at decision point 444 that additional reporting will not be performed, the process returns to FIG. 4A at decision point 402 and iterates as described above.

As such, the process 400 monitors subscriber message processing in a publish/subscribe (pub/sub) messaging environment. Subscriber devices that are configured to report processing completion and status of messages are identified and subscribers are selected for monitoring of message processing completion. Message processing completion reports are generated based upon message reporting configurations, either as requested from publisher devices or as configured for a message broker and tracking server. Action report messages may include statistics associated with processing completion at different subscriber devices and iterative processing of action report messages may be integrated over time to provide dynamic granular reporting configurations.

Figure 5:
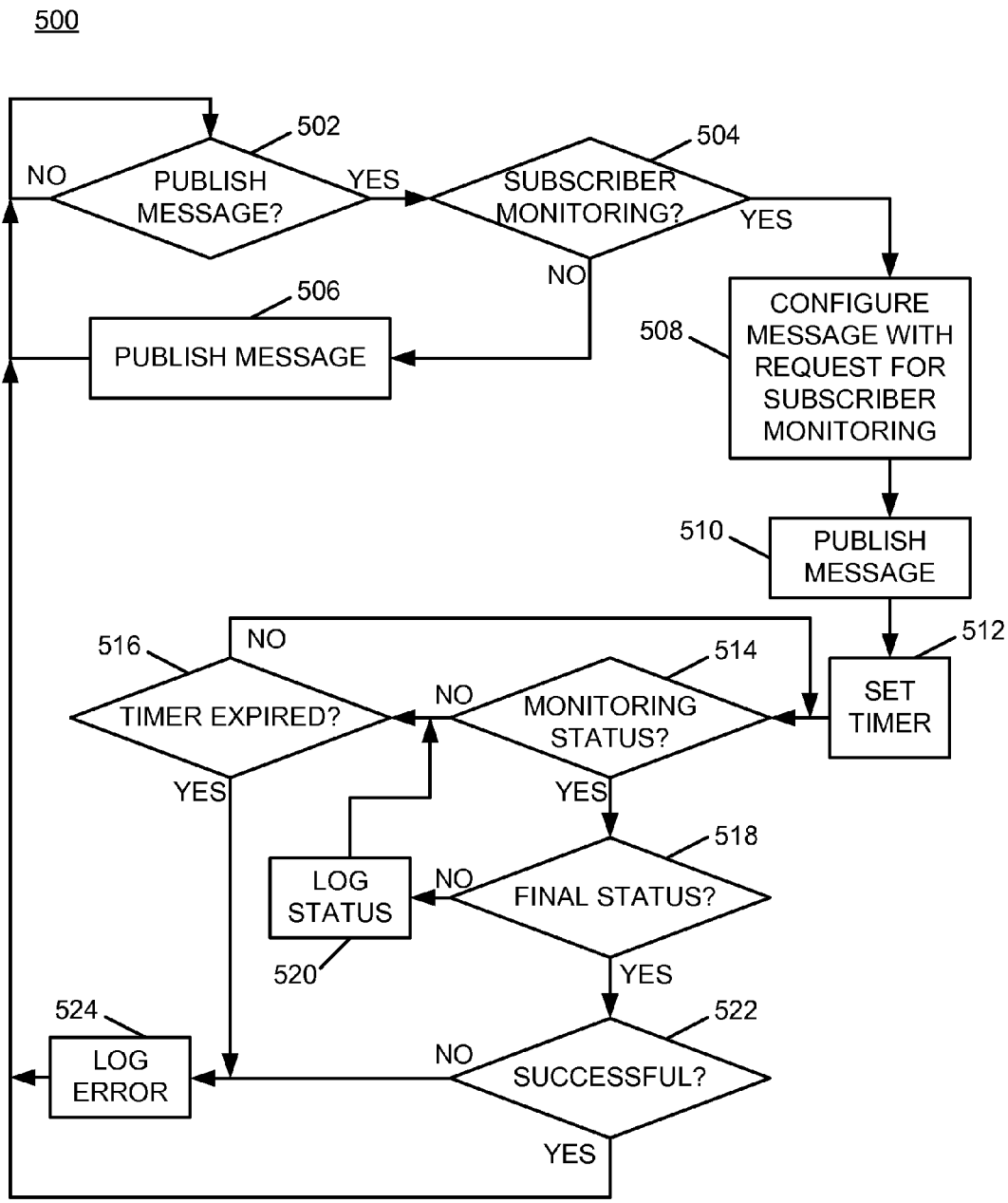
FIG. 5 is a flow chart of an example of an implementation of a process for automated monitoring of subscriber message processing in a publish/subscribe (pub/sub) messaging environment by a publisher device according to an embodiment of the present subject matter.

FIG. 5 is a flow chart of an example of an implementation of a process 500 for automated monitoring of subscriber message processing in a publish/subscribe (pub/sub) messaging environment by a publisher device, such as one of the publisher device_1 102 through the publisher device_N 104. At decision point 502, the process 500 makes a determination as to whether to publish a message to a topic. In response to determining to publish the message to a topic, the process 500 makes a determination at decision point 504 as to whether to request subscriber monitoring for the message to be published. In response to determining not to request subscriber monitoring for the message to be published, the process 500 publishes the message at block 506 and returns to decision point 502 and iterates as described above. It should be understood that publishing of a message by a publisher device may be performed by any implementation appropriate for a given implementation, such as sending the message to a publish/subscribe message tracking device.

In response to determining to request subscriber monitoring for the message to be published, the process 500 configures the message with the request for subscriber monitoring at block 508. Configuring the message to request subscriber monitoring may include adding one or more identifiers to the message, such as time-based reporting requests, a preferred number of subscribers to monitor, statistical reporting requests (e.g., number of successfully processed messages, etc.), and other monitoring and/or reporting criteria.

At block 510, the process 500 publishes the message to a publish/subscribe message tracking device, such as the message broker and tracking server 108. At block 512, the process 500 sets a timer. The timer may be used by the publisher device to determine, for example, when to check for action report messages/subscriber processing reporting. As described above, API calls may be made available to publisher devices for retrieving action report messages. Other reporting options are possible and all are considered within the scope of the present subject matter.

At decision point 514, the process 500 makes a determination as to whether any monitoring status has been received or is available (e.g., via an API call), as appropriate for the given implementation. To reduce complexity of the present example, this determination will be referred to below as a determination as to whether monitoring status has been received regardless of the particular implementation for obtaining or receiving the monitoring status.

In response to determining that no monitoring status has been received, the process 500 makes a determination at decision point 516 as to whether the timer has expired. In response to determining that the timer has not expired, the process 500 returns to decision point 514 and iterates as described above and in more detail below.

In response to determining at decision point 514 that monitoring status has been received, the process 500 makes a determination at decision point 518 as to whether final status or partial status has been received. Partial status may be provided by a publish/subscribe message tracking device periodically or as requested within the published message. Final status may be received in association with completion of processing by all specified or configured subscriber devices or in response to a monitoring timeout and/or failure of processing by one or more subscriber devices.

In response to determining that partial status has been received at decision point 518 (e.g, final status has not yet been received), the process 500 logs the received partial status at block 520 and returns to decision point 516 and iterates as described above and in more detail below. In response to determining at decision point 518 that final status has been received, the process 500 makes a determination at decision point 522 as to whether all subscribers have successfully processed the published message. In response to determining that all subscribers have successfully processed the published message, the process 500 returns to decision point 502 and iterates as described above and in more detail below.

Returning to decision point 516, in response to determining that the timer has expired, or in response to determining at decision point 522 that all subscribers have not successfully processed the published message, the process 500 logs an error at block 524 and returns to decision point 502 and iterates as described above.

As such, the process 500 allows publisher devices to request and process action report messages that indicate processing success for published messages. The process 500 may configure a message for monitoring by one or more subscriber devices and send the message to a publish/subscribe message tracking device for implementation of the requested processing. As described above, the publish/subscribe message tracking device may also implement message configuration to enhance and/or change the requested processing monitoring. Any modifications by the publish/subscribe message tracking device to processing monitoring may be communicated to the publisher device, for example, via one or more partial status messages.

Figure 6:
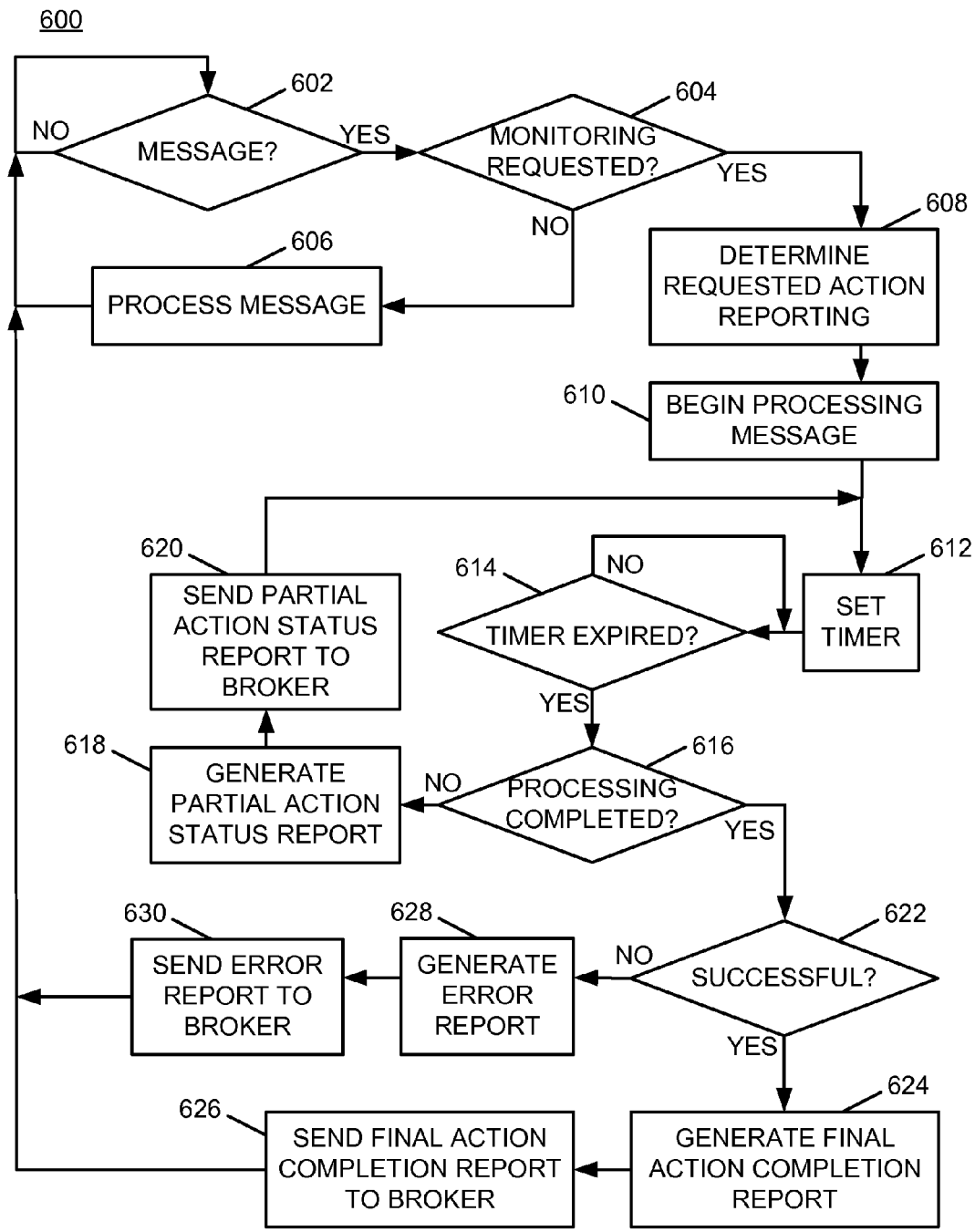
FIG. 6 is a flow chart of an example of an implementation of a process for automated monitoring of subscriber message processing in a publish/subscribe (pub/sub) messaging environment by a subscriber device according to an embodiment of the present subject matter.

FIG. 6 is a flow chart of an example of an implementation of a process 600 for automated monitoring of subscriber message processing in a publish/subscribe (pub/sub) messaging environment by a subscriber device, such as one of the subscriber device_1 110 through the subscriber device_M 112. At block 602, the process 600 makes a determination as to whether a message associated with a subscribed topic from a publish/subscribe message tracking device, such as the message broker and tracking server 108, has been received. As described above, in one example implementation, the message may be received as part of a two-phase commit protocol implementation between the publish/subscribe message tracking device and the subscriber device executing the process 600. In response to determining that a message has been received, the process 600 makes a determination at decision point 604 as to whether monitoring has been requested by either the originating publisher device or the publish/subscribe message tracking device from which the message was received. In response to determining that monitoring has not been requested, the process 600 processes the message at block 606 and returns to decision point 602 to await a new message and iterates as described above and in more detail below.

In response to determining that monitoring has been requested, the process 600 determines the requested action reporting at block 608. The requested action reporting may include partial (e.g., processing status) reporting. At block 610, the process 600 begins processing the message. At block 612, the process 600 sets a timer, such as for any requested reporting interval or for final action completion reporting. At decision point 614, the process 600 makes a determination as to whether the timer has expired. In response to determining that the timer has expired, the process 600 makes a determination at decision point 616 as to whether message processing has been completed. In response to determining that processing has not been completed, the process 600 generates a partial action status report at block 618. At block 620, the process 600 sends the partial action status report to the broker (e.g., publish/subscribe message tracking device), and returns to block 612 to reset the timer and iterates as described above and in more detail below. As described above, action report messages may be sent to a publish/subscribe message tracking device in a variety of manners, such as API calls available to the publish/subscribe message tracking device or other mechanism as appropriate for a given implementation.

In response to determining at decision point 616 that message processing has been completed, the process 600 makes a determination at decision point 622 as to whether message processing has been successfully completed. In response to determining that message processing has been successfully completed, the process 600 generates a final action completion report with a successful completion status indicator at block 624. For a two-phase protocol implementation, the process 600 may create a commit message including a commit status indicating commitment to indicate the action completion processing by the subscriber device. At block 626, the process 600 sends the final action completion report with the successful completion status indicator to the broker by a mechanism appropriate for the given implementation and returns to decision point 602 and iterates as described above and below.

In response to determining at decision point 622 that message processing has not been successfully completed, the process 600 generates an action processing error report at block 628. For a two-phase protocol implementation, the process 600 may create a rollback message including a non-commit status indicating rollback of the transaction to indicate failure of the message processing by the subscriber device. At block 630, the process 600 sends the error report to the broker by a mechanism appropriate for the given implementation and returns to decision point 602 and iterates as described above.

As such, the process 600 allows subscriber devices to respond to requests for message processing status and action report messages that indicate processing success for received messages. The process 600 determines requested action reporting criteria (e.g., periodicity, final, etc.) and sends action report messages to a publish/subscribe message tracking device.

As described above in association with FIG. 1 through FIG. 6, the example systems and processes provide monitoring of subscriber message processing in a publish/subscribe (pub/sub) messaging environment. Many other variations and additional activities associated with monitoring of subscriber message processing in a publish/subscribe (pub/sub) messaging environment are possible and all are considered within the scope of the present subject matter.

Those skilled in the art will recognize, upon consideration of the above teachings, that certain of the above examples are based upon use of a programmed processor, such as CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   receiving, at a publish/subscribe message tracking device, a message published by a publisher device and associated with a subscription topic hosted by the publish/subscribe message tracking device, where subscriber devices that receive the message perform additional internal subscriber processing based upon content within the message published by the publisher device;
   determining to monitor status of the additional internal subscriber processing performed, based upon the content within the message, by at least one subscriber device;
   sending the message to the at least one subscriber device that is registered to the subscription topic and configured to report the status of the additional internal subscriber processing performed based upon the content within the message;
   monitoring the reported status of the additional internal subscriber processing performed, based upon the content within the message, by the at least one subscriber device; and
   publishing monitoring results of the monitored reported status of the additional internal subscriber processing performed, based upon the content within the message, by the at least one subscriber device.

2. The method of claim 1, where the content within the message comprises an action instructed to be performed by the at least one subscriber device and where determining to monitor the status of the additional internal subscriber processing performed, based upon the content within the message, by the at least one subscriber device comprises:
   determining that the monitoring of the status of the additional internal subscriber processing is enabled at the publish/subscribe message tracking device, and that a monitoring criterion has been established in accordance with at least one of a criticality level of the content within the message and a rating regarding an importance of message processing by the at least one subscriber device;
   determining whether the message comprises an indicator added by the publisher device requesting monitoring of completion of the additional internal subscriber processing by the subscriber devices; and
   determining to monitor the completion of the additional internal subscriber processing performed by the at least one subscriber device in accordance with the instructed action in response to determining that the monitoring of the completion of the additional internal subscriber processing is enabled, that the monitoring criterion has been established in accordance with at least one of the criticality level of the content within the message and the rating regarding the importance of message processing by the at least one subscriber device, and that the message comprises the indicator requesting the monitoring of the completion of the additional internal subscriber processing by the subscriber devices.

3. The method of claim 1, further comprising:
   configuring the message with a subscriber instruction to report completion of the additional internal subscriber processing performed by the at least one subscriber device in accordance with an action instructed within the content within the message and with at least one action completion processing report criterion that comprises at least one of a time-based constraint and an action completion processing report messaging constraint; and
   where monitoring the reported status of the additional internal subscriber processing performed, based upon the content within the message, by the at least one subscriber device comprises monitoring the completion of the additional internal subscriber processing performed by the at least one subscriber device in accordance with the instructed action based upon the configured at least one action completion processing report criterion.

4. The method of claim 1, where:
   sending the message to the at least one subscriber device that is registered to the subscription topic and configured to report the status of the additional internal subscriber processing performed, based upon the content within the message, comprises sending the message to the at least one subscriber device as a two-phase commit transaction; and
   monitoring the reported status of the additional internal subscriber processing performed, based upon the content within the message, by the at least one subscriber device comprises:
      receiving an action report message from the at least one subscriber device that comprises a commit status indicating a status of the two-phase commit transaction, where the commit status comprises one of a commit indicator and a rollback indicator.

5. The method of claim 1, where the content within the message comprises an action instructed to be performed by the at least one subscriber device and where monitoring the reported status of the additional internal subscriber processing performed, based upon the content within the message, by the at least one subscriber device comprises:
   receiving at least one action report message via an action reporting application programming interface (API) from the at least one subscriber device that comprises a status of completion of the additional internal subscriber processing performed by the at least one subscriber device, where each action report message comprises one of a positive and a negative action completion notification generated by a respective subscriber device that communicates a completion status of processing by the respective subscriber device of the instructed action.

6. The method of claim 1, where publishing the monitoring results of the monitored reported status of the additional internal subscriber processing performed, based upon the content within the message, by the at least one subscriber device comprises:
sending the monitoring results as an action report message to a first message queue specified within the message by the publisher device;
determining whether at least one other device is designated to receive published monitoring results; and
in response to determining that the at least one other device is designated to receive the published monitoring results:
determining whether the at least one other device has access to the first message queue; and
sending, in response to determining that the at least one other device does not have access to the first message queue, the action report message to a second message queue accessible to the at least one other device.

7. The method of claim 1, where publishing the monitoring results of the monitored reported status of the additional internal subscriber processing performed, based upon the content within the message, by the at least one subscriber device comprises one of:
publishing the monitoring results to a report topic subscribed to by the publisher device and designated for publication of report messages; and
providing the monitoring results to callers of an action reporting application programming interface (API), where the callers comprise at least one of the publisher device and at least one other device.

8. The method of claim 1, where the published monitoring results comprise:
a unique identifier associating the published monitoring results with the message;
a total number of subscriber devices eligible to receive the message;
a total number of the subscriber devices that have successfully completed processing of the content within the message;
a total number of the subscriber devices that have attempted but failed to complete processing of the content within the message; and
a total number of the subscriber devices that have not yet completed processing of the content within the message.

9. A system, comprising:
a communication module; and
a processor programmed to:
receive, via the communication module, a message published by a publisher device and associated with a hosted subscription topic, where subscriber devices that receive the message perform additional internal subscriber processing based upon content within the message published by the publisher device;
determine to monitor status of the additional internal subscriber processing performed, based upon the content within the message, by at least one subscriber device;
send, via the communication module, the message to the at least one subscriber device that is registered to the subscription topic and configured to report the status of the additional internal subscriber processing performed based upon the content within the message;
monitor the reported status of the additional internal subscriber processing performed, based upon the content within the message, by the at least one subscriber device; and
publish monitoring results of the monitored reported status of the additional internal subscriber processing performed, based upon the content within the message, by the at least one subscriber device.

10. The system of claim 9, where the content within the message comprises an action instructed to be performed by the at least one subscriber device and where, in being programmed to determine to monitor the status of the additional internal subscriber processing performed, based upon the content within the message, by the at least one subscriber device, the processor is programmed to:
determine that the monitoring of the status of the additional internal subscriber processing is enabled, and that a monitoring criterion has been established in accordance with at least one of a criticality level of the content within the message and a rating regarding an importance of message processing by the at least one subscriber device;
determine whether the message comprises an indicator added by the publisher device requesting monitoring of completion of the additional internal subscriber processing by the subscriber devices; and
determine to monitor the completion of the additional internal subscriber processing performed by the at least one subscriber device in accordance with the instructed action in response to determining that the monitoring of the completion of the additional internal subscriber processing is enabled, that the monitoring criterion has been established in accordance with at least one of the criticality level of the content within the message and the rating regarding the importance of message processing by the at least one subscriber device, and that the message comprises the indicator requesting the monitoring of the completion of the additional internal subscriber processing by the subscriber devices.

11. The system of claim 9, where the processor is further programmed to:
configure the message with a subscriber instruction to report completion of the additional internal subscriber processing performed by the at least one subscriber device in accordance with an action instructed within the content within the message and with at least one action completion processing report criterion that comprises at least one of a time-based constraint and an action completion processing report messaging constraint; and
where, in being programmed to monitor the reported status of the additional internal subscriber processing performed, based upon the content within the message, by the at least one subscriber device, the processor is programmed to monitor the completion of the additional internal subscriber processing performed by the at least one subscriber device in accordance with the instructed action based upon the configured at least one action completion processing report criterion.

12. The system of claim 9, where, in being programmed to:
send, via the communication module, the message to the at least one subscriber device that is registered to the subscription topic and configured to report the status of the additional internal subscriber processing performed, based upon the content within the message, the processor is programmed to send the message to the at least one subscriber device as a two-phase commit transaction; and monitor the reported status of the additional internal subscriber processing performed, based upon the content within the message, by the at least one subscriber device, the processor is programmed to:
receive, via the communication module, an action report message from the at least one subscriber device that comprises a commit status indicating a status of the two-phase commit transaction, where the commit status comprises one of a commit indicator and a rollback indicator.

13. The system of claim 9, where the content within the message comprises an action instructed to be performed by the at least one subscriber device and where, in being programmed to monitor the reported status of the additional internal subscriber processing performed, based upon the content within the message, by the at least one subscriber device, the processor is programmed to:
receive, via the communication module, at least one action report message via an action reporting application programming interface (API) from the at least one subscriber device that comprises a status of completion of the additional internal subscriber processing performed by the at least one subscriber device, where each action report message comprises one of a positive and a negative action completion notification generated by a respective subscriber device that communicates a completion status of processing by the respective subscriber device of the instructed action.

14. The system of claim 9, where, in being programmed to publish the monitoring results of the monitored reported status of the additional internal subscriber processing performed, based upon the content within the message, by the at least one subscriber device, the processor is programmed to:
send, via the communication module, the monitoring results as an action report message to a first message queue specified within the message by the publisher device;
determine whether at least one other device is designated to receive published monitoring results; and
in response to determining that the at least one other device is designated to receive the published monitoring results:
determine whether the at least one other device has access to the first message queue; and
send, via the communication module in response to determining that the at least one other device does not have access to the first message queue, the action report message to a second message queue accessible to the at least one other device.

15. The system of claim 9, where, in being programmed to publish the monitoring results of the monitored reported status of the additional internal subscriber processing performed, based upon the content within the message, by the at least one subscriber device, the processor is programmed to one of:
publish the monitoring results to a report topic subscribed to by the publisher device and designated for publication of report messages; and
provide, via the communication module, the monitoring results to callers of an action reporting application programming interface (API), where the callers comprise at least one of the publisher device and at least one other device.

16. The system of claim 9, where the published monitoring results comprise:
a unique identifier associating the published monitoring results with the message;
a total number of subscriber devices eligible to receive the message;
a total number of the subscriber devices that have successfully completed processing of the content within the message;
a total number of the subscriber devices that have attempted but failed to complete processing of the content within the message; and
a total number of the subscriber devices that have not yet completed processing of the content within the message.

17. A computer program product comprising a computer readable storage medium including computer readable program code, where the computer readable program code when executed on a computer causes the computer to:
receive a message published by a publisher device and associated with a hosted subscription topic, where subscriber devices that receive the message perform additional internal subscriber processing based upon content within the message published by the publisher device;
determine to monitor status of the additional internal subscriber processing performed, based upon the content within the message, by at least one subscriber device;
send the message to the at least one subscriber device that is registered to the subscription topic and configured to report the status of the additional internal subscriber processing performed based upon the content within the message;
monitor the reported status of the additional internal subscriber processing performed, based upon the content within the message, by the at least one subscriber device; and
publish monitoring results of the monitored reported status of the additional internal subscriber processing performed, based upon the content within the message, by the at least one subscriber device.

18. The computer program product of claim 17, where the content within the message comprises an action instructed to be performed by the at least one subscriber device and where, in causing the computer to determine to monitor the status of the additional internal subscriber processing performed, based upon the content within the message, by the at least one subscriber device, the computer readable program code when executed on the computer causes the computer to:
determine that the monitoring of the status of the additional internal subscriber processing is enabled, and that a monitoring criterion has been established in accordance with at least one of a criticality level of the content within the message and a rating regarding an importance of message processing by the at least one subscriber device;
determine whether the message comprises an indicator added by the publisher device requesting monitoring of completion of the additional internal subscriber processing by the subscriber devices; and
determine to monitor the completion of the additional internal subscriber processing performed by the at least one subscriber device in accordance with the instructed action in response to determining that the monitoring of the completion of the additional internal subscriber processing is enabled, that the monitoring criterion has been established in accordance with at least one of the criticality level of the content within the message and the rating regarding the importance of message processing by the at least one subscriber device, and that the message comprises the indicator requesting the monitoring of the completion of the additional internal subscriber processing by the subscriber devices.

19. The computer program product of claim 17, where the computer readable program code when executed on the computer further causes the computer to:
- configure the message with a subscriber instruction to report completion of the additional internal subscriber processing performed by the at least one subscriber device in accordance with an action instructed within the content within the message and with at least one action completion processing report criterion that comprises at least one of a time-based constraint and an action completion processing report messaging constraint; and
- where, in causing the computer to monitor the reported status of the additional internal subscriber processing performed, based upon the content within the message, by the at least one subscriber device, the computer readable program code when executed on the computer causes the computer to monitor the completion of the additional internal subscriber processing performed by the at least one subscriber device in accordance with the instructed action based upon the configured at least one action completion processing report criterion.

20. The computer program product of claim 17, where, in causing the computer to:
- send the message to the at least one subscriber device that is registered to the subscription topic and configured to report the status of the additional internal subscriber processing performed, based upon the content within the message, the computer readable program code when executed on the computer causes the computer to send the message to the at least one subscriber device as a two-phase commit transaction; and
- monitor the reported status of the additional internal subscriber processing performed, based upon the content within the message, by the at least one subscriber device, the computer readable program code when executed on the computer causes the computer to:
  - receive an action report message from the at least one subscriber device that comprises a commit status indicating a status of the two-phase commit transaction, where the commit status comprises one of a commit indicator and a rollback indicator.

21. The computer program product of claim 17, where the content within the message comprises an action instructed to be performed by the at least one subscriber device and where, in causing the computer to monitor the reported status of the additional internal subscriber processing performed, based upon the content within the message, by the at least one subscriber device, the computer readable program code when executed on the computer causes the computer to:
- receive at least one action report message via an action reporting application programming interface (API) from the at least one subscriber device that comprises a status of completion of the additional internal subscriber processing performed by the at least one subscriber device, where each action report message comprises one of a positive and a negative action completion notification generated by a respective subscriber device that communicates a completion status of processing by the respective subscriber device of the instructed action.

22. The computer program product of claim 17, where, in causing the computer to publish the monitoring results of the monitored reported status of the additional internal subscriber processing performed, based upon the content within the message, by the at least one subscriber device, the computer readable program code when executed on the computer causes the computer to:
- send the monitoring results as an action report message to a first message queue specified within the message by the publisher device;
- determine whether at least one other device is designated to receive published monitoring results; and
- in response to determining that the at least one other device is designated to receive the published monitoring results:
  - determine whether the at least one other device has access to the first message queue; and
  - send, in response to determining that the at least one other device does not have access to the first message queue, the action report message to a second message queue accessible to the at least one other device.

23. The computer program product of claim 17, where, in causing the computer to publish the monitoring results of the monitored reported status of the additional internal subscriber processing performed, based upon the content within the message, by the at least one subscriber device, the computer readable program code when executed on the computer causes the computer to one of:
- publish the monitoring results to a report topic subscribed to by the publisher device and designated for publication of report messages; and
- provide the monitoring results to callers of an action reporting application programming interface (API), where the callers comprise at least one of the publisher device and at least one other device.

24. The computer program product of claim 17, where the published monitoring results comprise:
- a unique identifier associating the published monitoring results with the message;
- a total number of subscriber devices eligible to receive the message;
- a total number of the subscriber devices that have successfully completed processing of the content within the message;
- a total number of the subscriber devices that have attempted but failed to complete processing of the content within the message; and
- a total number of the subscriber devices that have not yet completed processing of the content within the message.

* * * * *